(12) United States Patent
Hayata et al.

(10) Patent No.: US 6,788,364 B2
(45) Date of Patent: Sep. 7, 2004

(54) LIQUID CRYSTAL DISPLAY DEVICE

(75) Inventors: Hiroko Hayata, Mobara (JP);
Masayuki Hikiba, Mobara (JP);
Hitoshi Komeno, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/290,310

(22) Filed: Nov. 8, 2002

(65) Prior Publication Data

US 2003/0103179 A1 Jun. 5, 2003

(30) Foreign Application Priority Data

Dec. 4, 2001 (JP) ........................................ 2001-369654

(51) Int. Cl.[7] .............................................. G02F 1/1335
(52) U.S. Cl. ...................................... 349/113; 349/138
(58) Field of Search ............................ 349/113, 38, 39, 349/122, 138; 257/59; 438/30

(56) References Cited

U.S. PATENT DOCUMENTS 6,639,639 B2 * 10/2003 Baek et al. .................. 349/113

FOREIGN PATENT DOCUMENTS

| JP | 06-342153 | 6/1993 |
| JP | 2000-258802 | 3/1999 |

* cited by examiner

*Primary Examiner*—Robert H. Kim
*Assistant Examiner*—David Chung
(74) *Attorney, Agent, or Firm*—Reed Smith LLP; Stanley P. Fisher, Esq.; Juan Carlos A. Marquez, Esq.

(57) ABSTRACT

Light leakage within pixel area is prevented. A liquid crystal display device includes a light reflection area forming pixel electrode and a reflection film in one portion of a pixel area on a liquid crystal side face of one substrate oppositely arranged through the liquid crystal. A light transmission area forms the pixel electrode in another portion. The pixel electrode as the reflection film is formed on the upper face except for an opening portion of an insulating film. The opening portion is formed in a light transmission area. The opening portion of the insulating film has a fan-shaped taper from the substrate side to the liquid crystal side on the side wall face of this opening portion. At least one portion of this taper is not covered with the pixel electrode used as the reflection film, but is exposed. The insulating film has a light absorption property in at least the taper portion.

20 Claims, 5 Drawing Sheets

LIQUID CRYSTAL DISPLAY DEVICE

BACKGROUND OF THE INVENTION

The present invention relates to a liquid crystal display device, and particularly relates to a liquid crystal display device called a partial transmission type.

For example, the liquid crystal display device called the partial transmission type is used as a compact liquid crystal display device for a portable telephone, etc., and a screen image on the display face can be recognized by reflected light of the sun or the light of a built-in backlight in accordance with necessity.

Namely, areas surrounded by gate signal lines extended in the x-direction and arranged in parallel in the y-direction, and drain signal lines extended in the y-direction and arranged in parallel in the x-direction are set to pixel areas on the liquid crystal side face of one of transparent substrates respectively arranged oppositely through a liquid crystal. A thin film transistor operated by the supply of a scanning signal from one gate signal line, and a pixel electrode for supplying a video signal thereto from one drain signal line through this thin film transistor are formed in each of these pixel areas.

In the pixel area, this pixel electrode has a first pixel electrode also formed as a reflection film in one portion of the pixel area, and a second pixel electrode of a light transmission property formed in at least the other portions except for this one portion. An electric field is generated on the liquid crystal side face of the other substrate between this pixel electrode and an opposite electrode constructed by an electrode of the light transmission property commonly formed in each pixel area. The liquid crystal within the pixel area behaves by this electric field.

In this case, the forming portion of the first pixel electrode also used as the reflection film is used as a light reflection area, and the forming portion of the second pixel electrode of the light transmission property is used as a light transmission area.

The structure that an insulating film (protecting film) also covering the thin film transistor, etc. is formed on the face of one substrate forming the first and second pixel electrodes thereon and an opening portion is formed in the above optical transmission area of this insulating film, is also known. This structure is used to improve the light transmittance of light transmitted through this area.

However, when the liquid crystal display device constructed in this way is used as a light transmission mode and black display is performed, it has been confirmed that light leakage is generated at the boundary of the light reflection area and the light transmission area so that contrast of the display is reduced.

The present invention has been made on the basis of such a situation, and an object of the present invention is to provide a liquid crystal display device for avoiding light leakage.

SUMMARY OF THE INVENTION

Typical summaries of the invention disclosed in the present application are explained as follows.

Means 1.

For example, a liquid crystal display device in the present invention comprises a light reflection area for forming a pixel electrode also used as a reflection film in one portion of a pixel area on a liquid crystal side face of one of substrates oppositely arranged through a liquid crystal, and a light transmission area for forming the pixel electrode of a light transmission property in another portion except for at least the one portion;

wherein the pixel electrode also used as the reflection film is formed on the upper face except for an opening portion of an insulating film in which the opening portion is formed in a portion corresponding to the light transmission area, and the opening portion of the insulating film has a taper formed in a fanwise shape from the substrate side to the liquid crystal side on the side wall face of this opening portion, and at least one portion of this taper is not covered with the pixel electrode also used as the reflection film, but is exposed, and the insulating film has a light absorption property in at least the taper portion.

Means 2.

For example, the liquid crystal display device in the present invention is characterized in that the entire insulating film has the light absorption property with the construction of the means 1 as a premise.

Means 3.

For example, the liquid crystal display device in the present invention is characterized in that the insulating film has a dark color in its light absorption property with the construction of the means 1 or 2 as a premise.

Means 4.

For example, the liquid crystal display device in the present invention is characterized in that the insulating film has a black color in its light absorption property with the construction of one of the means 1 to 3 as a premise.

Means 5.

For example, the liquid crystal display device in the present invention is characterized in that the entire insulating film has the light absorption property, and the light transmittance of its maximum film thickness portion is 30% or less with the construction of the means 1 as a premise.

Means 6.

For example, the liquid crystal display device in the present invention is characterized in that the entire insulating film has the light absorption property, and the light transmittance of its maximum film thickness portion is 10% or less with the construction of the means 1 as a premise.

Means 7.

For example, the present invention also resides in a liquid crystal display device in which each of areas surrounded by gate signal lines arranged in parallel on a liquid crystal side face of one of substrates oppositely arranged through a liquid crystal, and drain signal lines crossing these gate signal lines and arranged in parallel is set to a pixel area;

a switching element operated by a scanning signal from the gate signal line and a pixel electrode for supplying a video signal thereto from the drain signal line through this switching element are arranged in these pixel areas;

the liquid crystal display device has at least an insulating film covering the drain signal line and formed in at least one portion of the pixel area, and a material also used as a reflection film formed on the upper face of the insulating film in at least one portion of the pixel area as the pixel electrode, and the insulating film has a light absorption property, and the pixel electrode also used as the reflection film is formed by arranging a clearance between the pixel electrode and the drain signal line when the pixel electrode is seen in a plane.

Means 8.

For example, the liquid crystal display device in the present invention is characterized in that the liquid crystal display device uses a normally black mode in which black display is performed when an electric field applied to the liquid crystal is small with the construction of one of the means 1 to 7 as a premise.

Means 9.

For example, the liquid crystal display device in the present invention is characterized in that a backlight is arranged on the side opposed to the liquid crystal of the one substrate with the construction of one of the means 1 to 8 as a premise.

The present invention is not limited to the above constructions, but can be variously modified in the scope not departing from the technical idea of the present invention.

DESCRIPTION OF THE PREFERRED EMBODIMENTS

The embodiments of a liquid crystal display device in the present invention will next be explained by using the drawings.

Embodiment 1.

External Appearance Construction

Figure 2A:
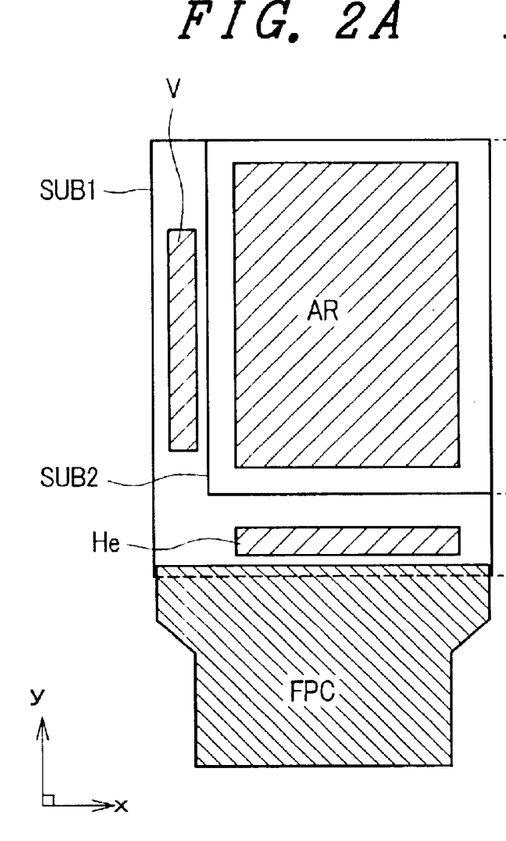
FIGS. 2A to 2B are respectively plan and side views of an external appearance construction showing one embodiment of the liquid crystal display device in the present invention.
Figure 2B:
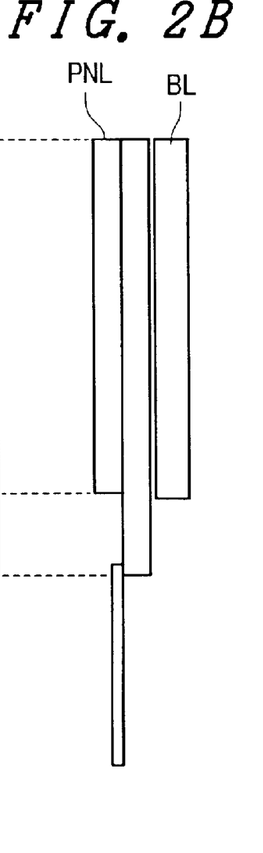

FIGS. 2A and 2B are respectively constructional plan and side views showing one embodiment of the liquid crystal display device in the present invention.

For example, these figures show the liquid crystal display device assembled into a portable telephone set. This liquid crystal display device is constructed by a liquid crystal display panel PNL and a backlight BL arranged on the rear face of this liquid crystal display panel PNL.

In the liquid crystal display panel, an envelope is constructed by a transparent substrate SUB1 and a transparent substrate SUB2 arranged oppositely to this transparent substrate SUB1 through a liquid crystal.

The above liquid crystal is sealed by an unillustrated sealant for fixing the transparent substrates SUB1 and SUB2.

An area surrounded by the sealant constitutes a liquid crystal display section AR by arranging many pixels in a matrix shape.

Each pixel has a rectangular area surrounded by gate signal lines extended in the x-direction and arranged in parallel in the y-direction, and drain signal lines extended in the y-direction and arranged in parallel in the x-direction on the liquid crystal side face of the transparent substrate SUB1 although this structure is not shown in the drawings. Each pixel is constructed by forming a thin film transistor, a pixel electrode, a capacity element, etc. within this rectangular area. The construction in this pixel area will be described later in detail.

One end of each of the above gate signal lines is extended across the above sealant, and is connected to a scanning signal driving circuit V formed on the upper face of the transparent substrate SUB1. One end of each of the above drain signal lines is also extended across the above sealant, and is connected to a video signal driving circuit He formed on the upper face of the transparent substrate SUB1.

For example, a flexible wiring board FPC is connected to one side portion of the transparent substrate SUB1 on the forming side of the video signal driving circuit He, and signals are supplied to the above scanning signal driving circuit V and the video signal driving circuit He through this flexible wiring board FPC.

Equivalent Circuit of Pixel

Figure 3:
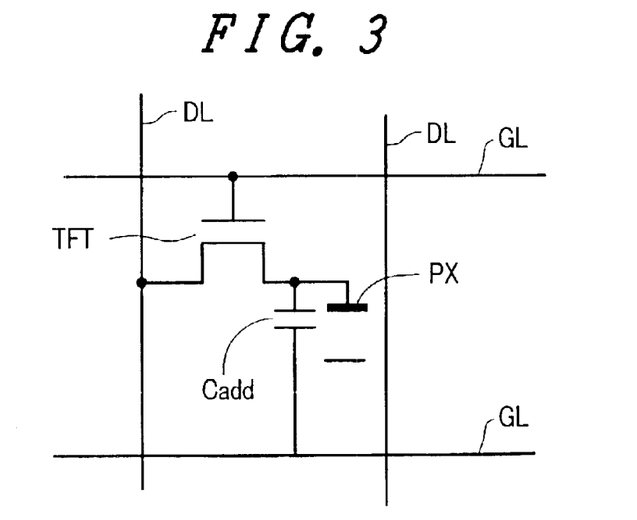
FIG. 3 is an equivalent circuit diagram showing one embodiment of the pixel of the liquid crystal display device in the present invention.

FIG. 3 shows an equivalent circuit diagram of the above pixel. There is a thin film transistor TFT turned on by the supply of a scanning signal from one gate signal line GL of a pair of gate signal lines GL demarcating the pixel area. There is also a pixel electrode PX to which a video signal from one drain signal line DL of a pair of drain signal lines DL demarcating this pixel area is supplied through this turned-on thin film transistor TFT.

A capacity element Cadd is formed between the pixel electrode PX and the other gate signal line of the above pair of gate signal lines. This capacity element Cadd is arranged to accumulate the video signal for a relatively long time, etc. when the video signal is supplied to the above pixel electrode PX.

Construction of Pixel

Figure 4:
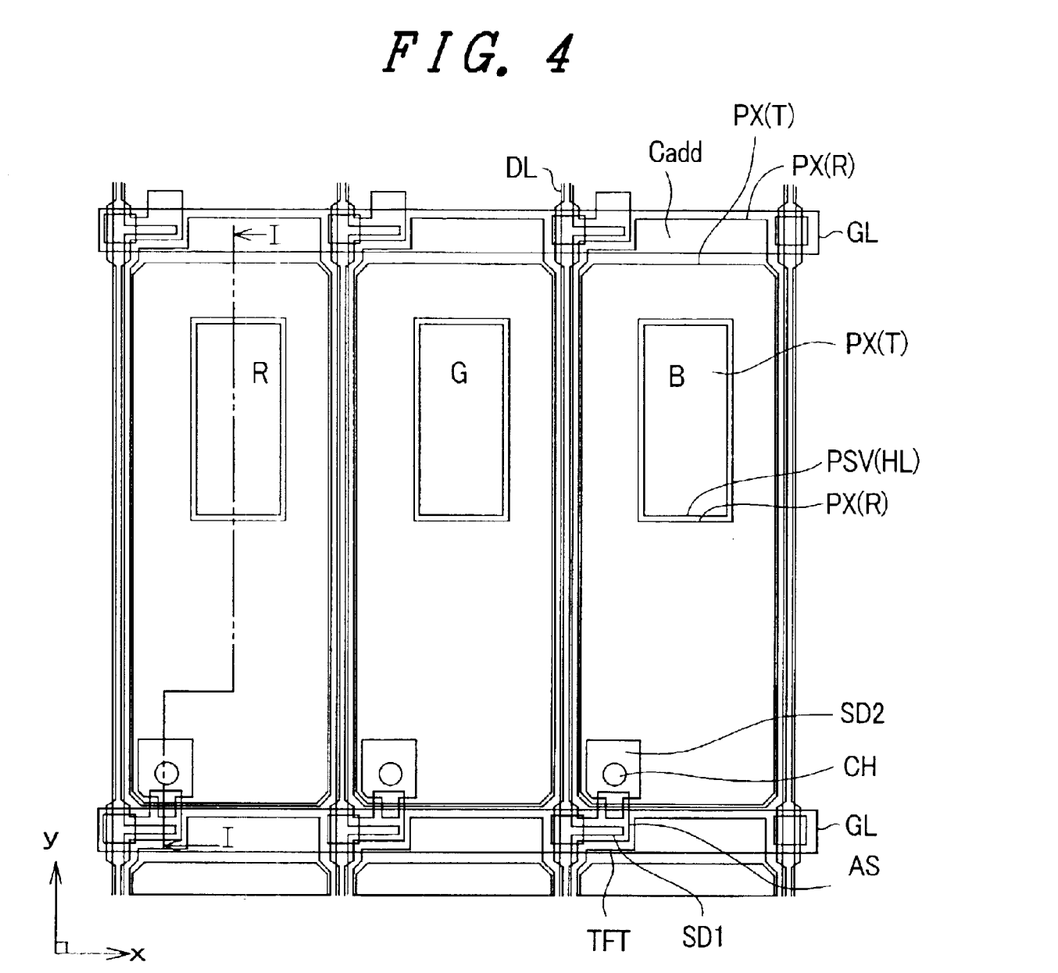
FIG. 4 is a plan view showing one embodiment of the pixel of the liquid crystal display device in the present invention.

FIG. 4 is a plan view showing the construction of three pixel areas arranged in parallel in the x-direction among the above respective pixel areas. In the construction in each of the three pixel areas, only the color of a color filter in charge of each color of R, G, B is different, but the other constructions are similar to each other.

Figure 1:
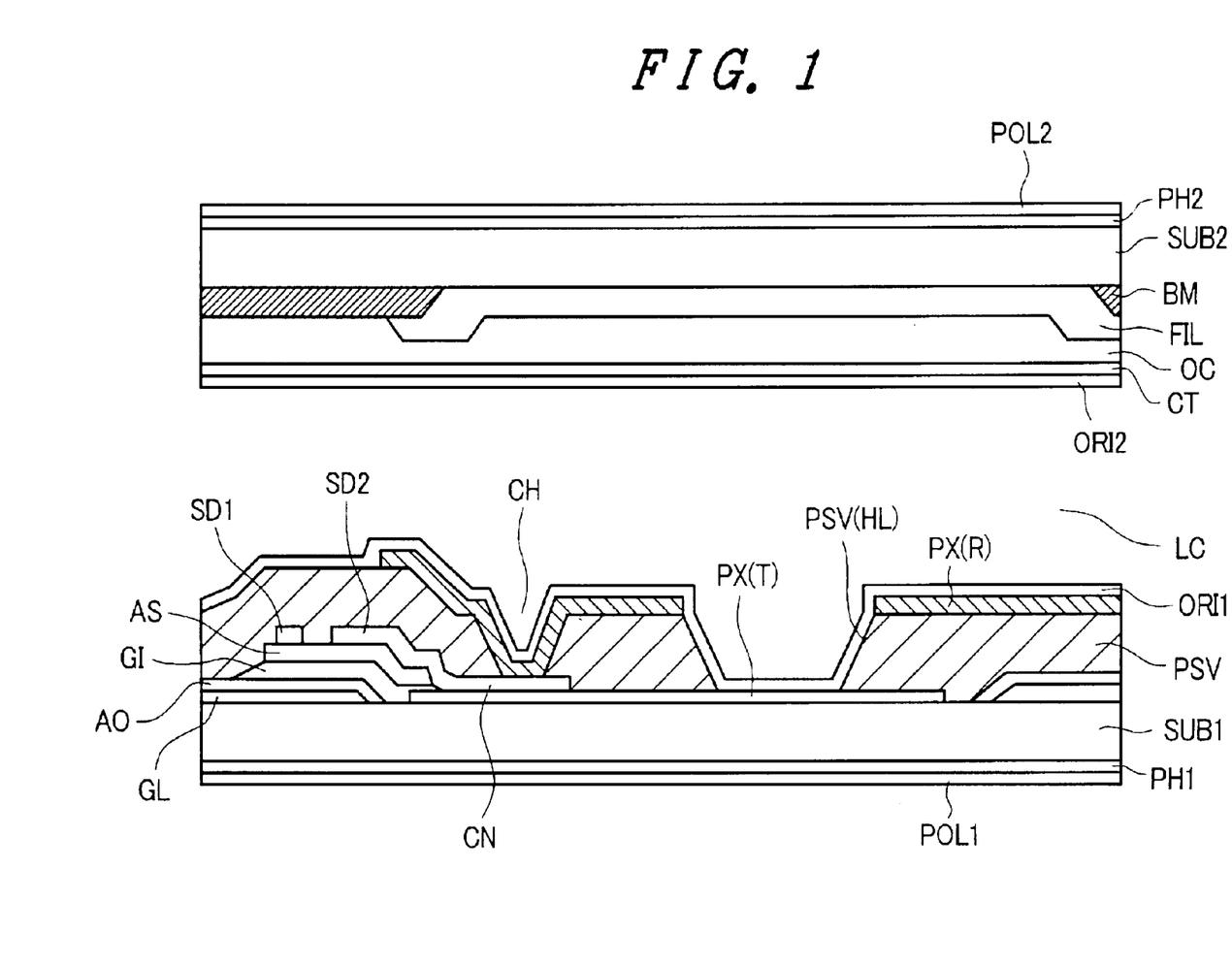
FIG. 1 is a sectional view showing one embodiment of a pixel of a liquid crystal display device in the present invention.

In the following explanation, only the construction of one of these pixel areas will be explained. FIG. 1 shows a sectional view taken along an I—I line of FIG. 4.

A pair of gate signal lines GL extended in the x-direction and arranged in parallel in the y-direction is first formed on the liquid crystal side face of the transparent substrate SUB1. For example, this gate signal line GL is constructed by Al or its alloy, and its surface is formed as an anode and is coated with an oxide film AO.

These gate signal lines GL surround a rectangular area together with a pair of drain signal lines DL described later, and this area is constructed as the pixel area.

For example, a pixel electrode PX(T) of a light transmission property constructed by an ITO (Indium-Tin-Oxide) film is formed in a central area except for the periphery of this pixel area. This pixel electrode PX(T) is a pixel electrode in a portion corresponding to the light transmission area within the pixel area, but is also formed in an area except for the above light transmission area so as to be connected to a source electrode SD2 of the thin film transistor TFT as clarified in the explanation described later.

For example, an insulating film GI constructed by SiN is formed on the surface of the transparent substrate SUB1 in a forming area of the thin film transistor TFT and the drain signal line DL described later. For example, the forming area of the thin film transistor TFT is set to an area superposed on one portion of the gate signal line GL in the case of this embodiment.

This insulating film GI has a function as an interlayer insulating film with respect to the above gate signal line GL in the forming area of the drain signal line DL described later, and also has a function as a gate insulating film of the thin film transistor TFT in the forming area of the thin film transistor TFT described later.

For example, a semiconductor layer AS constructed by amorphous Si is formed so as to be laminated with this insulating film GI.

This semiconductor layer AS is that of the thin film transistor, and it is possible to construct a MIS type transistor of a reverse stagger structure in which one portion of the above gate signal line GL is set to a gate electrode by forming a drain electrode SD1 and a source electrode SD2 on the upper face of the semiconductor layer AS.

The semiconductor layer AS is also formed in the forming area of the drain signal line DL described later so as to strengthen the function as the interlayer insulating film with respect to the gate signal line GL.

Here, the above drain electrode SD1 and the source electrode SD2 are simultaneously formed in the formation of the drain signal line DL.

Namely, the drain signal line DL extended in the y-direction and arranged in parallel in the x-direction is formed, and the drain electrode SD1 is formed by extending one portion of this drain signal line DL until the upper face of the above semiconductor layer AS. Further, the source electrode SD2 is formed such that this source electrode SD2 is separated by the channel length of the thin film transistor TFT from this drain electrode SD1.

This source electrode SD2 is slightly extended from the semiconductor layer AS face to the central side of the pixel area, and is connected to the pixel electrode PX(T) having the light transmission property. A contact portion CN for making connection with the pixel electrode PX(R) also used as a reflection film described later is formed.

A thin layer doping impurities of high concentration thereto is formed at the interface of the semiconductor layer AS, the drain electrode SD1 and the source electrode SD2, and functions as a contact layer.

For example, an impurity layer of high concentration is already formed on the surface of the semiconductor layer AS when the semiconductor layer AS is formed. The above contact layer can be formed by setting the pattern of the drain electrode SD1 and the source electrode SD2 formed on the upper face of the impurity layer to a mask, and etching the above impurity layer exposed from this mask.

For example, a protecting film PSV constructed by an organic material layer such as resin, etc. is formed on the surface of the transparent substrate SUB1 on which the thin film transistor TFT, the drain signal line DL, the drain electrode SD1 and the source electrode SD2 are thus formed. This protecting film PSV is a layer for avoiding direct contact with a liquid crystal of the above thin film transistor TFT, and prevents the deterioration of characteristics of the thin film transistor TFT. This protecting film PSV is also an insulating film.

For example, the material of this protecting film PSV is constructed by photosensitive acrylic, photosensitive epoxy, photosensitive polyimide or photosensitive novolac. The light transmittance of the protecting film PSV itself is reduced by adding a pigment or a dye as a light absorption material to the material of the protecting film PSV.

Here, carbon black, titanium oxide, iron-copper manganese, chromium-copper manganese, etc. are selected as the pigment or the dye.

In this case, with respect to the degree of the light absorption property of the above protecting film PSV, the light transmittance in a maximum film thickness portion of the protecting film PSV is suitably set to 30% or less, and is desirably set to 10% or less.

The protecting film PSV constructed in this way has a dielectric constant $\in r$ of 1 to 10, desirably 1 to 7, more desirably 1 to 5.

This is because the effect of reducing coupling capacity of the gate signal line GL or the drain signal line DL, and the pixel electrode PX(R) or the pixel electrode PX(T), etc. is obtained by reducing the dielectric constant of the protecting film PSV.

In the protecting film PSV constructed in this way, an opening portion PSV(HL) is formed in the light transmission area within the pixel area. This opening portion is formed to improve the light transmittance of light from the backlight BL transmitted through this area. In the size of this opening portion, for example, the opening portion has about 100 $\mu$m in the length of a side parallel to the y-direction, and 20 to 30 $\mu$m in the length of a side parallel to the x-direction.

In this case, since the above opening portion PSV(HL) is formed in the protecting film PSV by using a photolithography technique, a taper having a fanwise shape is formed on the side wall face of the opening portion PSV(HL) from the transparent substrate SUB1 side to the liquid crystal LC side. The processing face of the transparent substrate SUB1 on its liquid crystal side can be gently formed by this taper, which is advantageous to form a reliable orientation film ORI1.

The pixel electrode PX(R) also having the function of a reflection film is formed on the upper face of the protecting film PSV. For example, this pixel electrode PX(R) is constructed by Al or its alloy, etc. to improve light reflection efficiency.

In FIG. 1, the pixel electrode PX(R) is formed without reaching the side wall face (taper) of the opening portion PSV(HL) of the protecting film PSV. However, the pixel electrode PX(R) may be also formed such that this pixel electrode PX(R) reaches one portion of this side wall face.

This pixel electrode PX(R) is formed in the light reflection area within the pixel area, and is connected to the contact portion CN of the source electrode SD2 of the above thin film transistor TFT through a contact hole CH formed in advance in the above protecting film PSV.

Further, this pixel electrode PX(R) is extended until above another adjacent gate signal line GL different from the gate signal line GL for operating the thin film transistor TFT connected to this pixel electrode PX(R), and forms a portion superposed on this another gate signal line GL.

In this superposing portion, the capacity element Cadd with the protecting film PSV as a dielectric film is formed between the pixel electrode PX(R) and another gate signal line GL.

For example, this capacity element Cadd has a function for accumulating a video signal supplied to the pixel electrodes PX(R), PX(T) for a relatively long time, etc.

An orientation film ORI1 is formed on the upper face of the transparent substrate SUB1 forming the pixel electrode PX(R) thereon, and also covers this pixel electrode PX(R).

This orientation film ORI1 is a film directly abutting on the liquid crystal LC, and determines the initial orientation direction of a molecule of the liquid crystal LC by rubbing performed on the surface of this orientation film.

A phase difference plate PH1 and a polarizing plate POL1 are sequentially stuck to the face of the transparent substrate SUB1 on the side opposed to the liquid crystal LC.

A black matrix BM is formed on the liquid crystal side face of the transparent substrate SUB2 oppositely arranged through the liquid crystal LC so as to demarcate each pixel area of this transparent substrate SUB2. Namely, the black matrix BM formed in at least a liquid crystal display section AR has a pattern having an opening formed in an area in which a peripheral portion of each pixel area is left, thereby improving the contrast of display.

This black matrix BM is formed so as to sufficiently cover the thin film transistor TFT on the transparent substrate SUB1 side so that the deterioration of characteristics of the thin film transistor TFT is avoided by preventing the irradiation of external light to the thin film transistor TFT.

In this embodiment, no black matrix BM may be particularly formed. This is because the protecting film PSV having a dark color and formed on the transparent substrate SUB1 side also has the function of this black matrix BM.

A color filter FIL is formed on the face of the transparent substrate SUB2 forming the black matrix BM therein so as to cover the opening of the black matrix BM. For example, this color filter is constructed by a filter of each color of red (R), green (G) and blue (B). For example, the red filter is commonly formed in each pixel area group arranged in parallel in the y-direction. This color filter is commonly formed in a pixel area group sequentially adjacent to the above pixel area group in the x-direction in the array of red (R), green (G), blue (B), red (R), - - - . Each of these filters is constructed by a resin film including a pigment corresponding to each color.

A flattened film OC is formed on the surface of the transparent substrate SUB2 forming the black matrix BM and the color filter FIL therein so as to also cover the black matrix BM and the color filter FIL. This flattened film OC is constructed by a resin film able to be formed by coating, and is arranged to remove a step difference actualized by forming the above black matrix BM and the color filter FIL.

For example, an electrically conductive film of a light transmission property constructed by an ITO film is formed on the upper face of this flattened film OC, and a common opposite electrode CT is formed by this electrically conductive film in each pixel area.

Further, an orientation film ORI2 is formed on the surface of this opposite electrode CT. This orientation film ORI2 is a film directly abutting on the liquid crystal LC, and determines the initial orientation direction of a molecule of the liquid crystal LC by rubbing performed on the surface of this orientation film ORI2.

A phase difference plate PH2 and a polarizing plate POL2 are sequentially stuck to the face of the transparent substrate SUB2 on the side opposed to the liquid crystal LC.

Consideration

Figure 5:
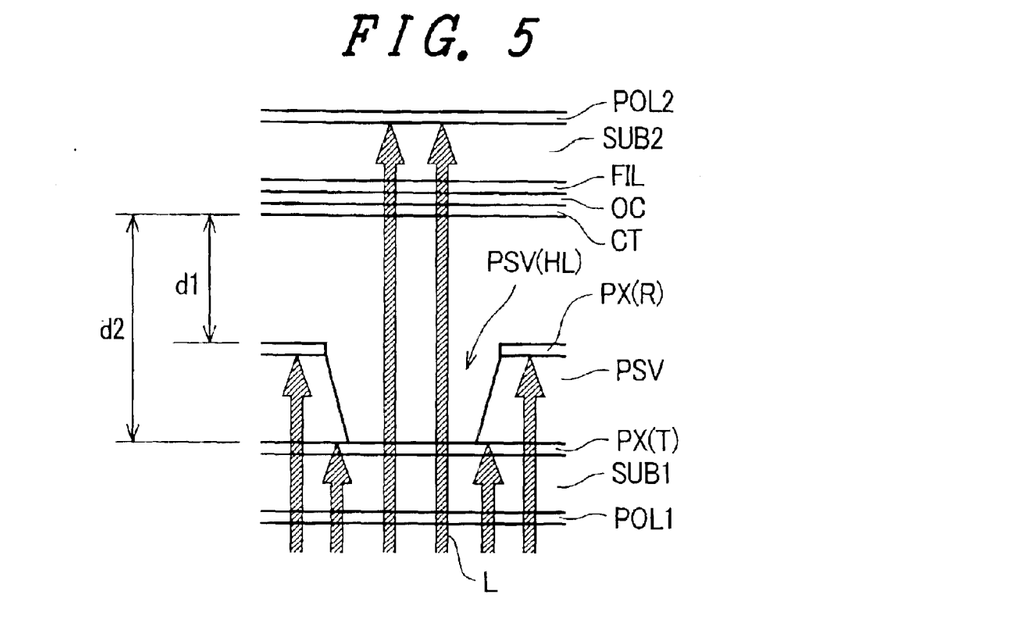
FIG. 5 is an explanatory view showing effects of the liquid crystal display device in the present invention.

FIG. 5 is an explanatory view showing the transmission degree of light in a light transmission area TA in the pixel area and a light reflection area RA around this light transmission area TA.

As mentioned above, the opening portion PSV(HL) is formed in the above protecting film PSV in the light transmission area TA, and the taper having a fanwise shape is formed on the side wall face of the opening portion PSV (HL) from the transparent substrate SUB1 side to the liquid crystal LC side.

Figure 6:
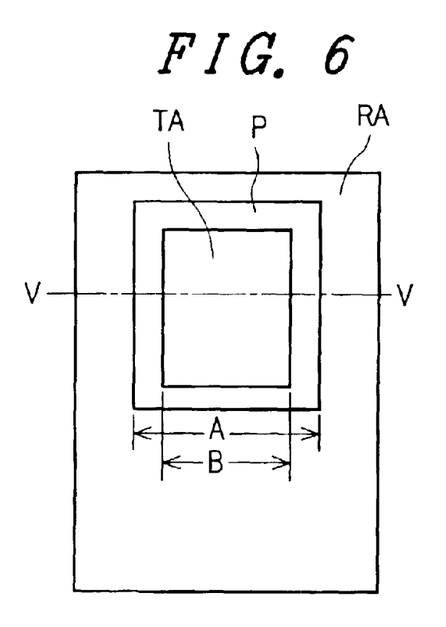
FIG. 6 is an explanatory view showing the effects of the liquid crystal display device in the present invention.

When the pixel area is observed in a plane, this taper portion is formed as an area P of a ring shape having a narrow width between the light reflection area RA and the light transmission area TA as shown in FIG. 6. A sectional view taken along line V—V of FIG. 6 corresponds to the above FIG. 5.

FIG. 5 shows a case in which black display is performed in a light transmission mode for performing display by utilizing light L from the backlight BL. A gap $d_2$, etc. are set such that the light L from the backlight BL is absorbed by the polarizing plate POL2 when this light L is transmitted through the light transmission area and reaches the polarizing plate POL2 through the liquid crystal LC.

The protecting film PSV of a taper portion is conventionally transparent and the light from the backlight from the transparent substrate SUB1 side is transmitted in the ring-shaped area P. In this case, if the liquid crystal behaves in this taper portion similarly to the light transmission area TA surrounded by this taper portion, the liquid crystal can function as the light transmission area TA. However, the gap of the liquid crystal is changed from $d_2$ to $d_1$ as shown in FIG. 5. Therefore, display different from that in the light transmission area TA is performed. One portion of the light passes through the polarizing plate POL2 so that light leakage is caused.

The above light leakage is caused even when any one of a normally black mode and a normally white mode is used as the display mode of the liquid crystal. In particular, the light leakage becomes notable in the above taper portion in the black display in the light transmission mode using the normally black mode. It is confirmed that this light leakage is recognized as a ring-shaped narrow width.

Therefore, as shown in the above embodiment, the above light leakage is reduced by constructing the protecting film PSV constituting the taper portion such that this protecting film PSV has at least a dark color. This color is most preferably set to black.

Thus, the above pigment or dye added to the protecting film PSV is not necessarily mixed in the entire area of the protecting film PSV, but the effect of the present invention is obtained if the above pigment or dye is mixed in at least said taper portion.

As another method, it has been tried that the pixel electrode PX(R) also used as the reflection film is extended until the taper portion of the opening portion PSV(HL) of the protecting film PSV, and the light from the transparent substrate SUB1 side is shielded by this extending portion. However, it has been confirmed that the light leakage is caused in the light reflection mode.

When the opening width of the upper face of the opening portion PSV(HL) of the above protecting film PSV is set to A and the opening width of the bottom face is set to B in FIG. 6, it is desirable to have the relation of 100%>B/A≧90% in view of the improvement of a transmission numerical aperture.

Force for absorbing light is small in a place in which the film thickness of the taper portion of the protecting film PSV is thin. However, it is close to the optimum gap $d_2$ for performing the black display. Therefore, there is no problem since the light leakage is almost not caused and is inconspicuous.

Embodiment 2.

Figure 7:
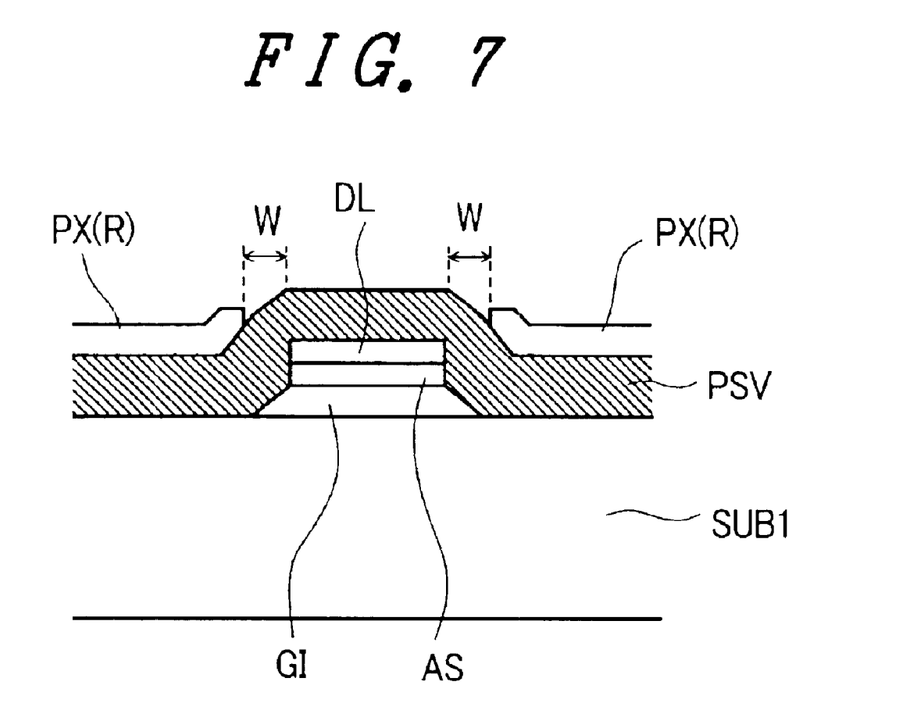
FIG. 7 is a sectional view showing another embodiment of the pixel of the liquid crystal display device in the present invention.

In this embodiment, in accordance with the construction for setting the protecting film PSV to have a dark color as explained in the embodiment 1, an overlapping area with the pixel electrode PX(R) also used as the reflection film with respect to the drain signal line DL is removed as shown in FIG. 7, and a clearance w is formed between the drain signal line DL and the pixel electrode PX(R).

Namely, for example, when the protecting film PSV is in a transparent state, it is advantageous to superpose the pixel electrode PX(R) also used as the reflection film on the drain signal line DL adjacent to this pixel electrode PX(R), and remove the clearance therebetween. This is because it is possible to prevent the light of the backlight BL from being leaked from the clearance between the drain signal line DL and the above pixel electrode PX(R).

However, the above light leakage can be prevented by the protecting film PSV by constructing the protecting film PSV so as to have a dark color. Accordingly, it is possible to set the construction shown in this embodiment.

In this case, the effect of being able to greatly reduce the capacity coupling of the drain signal line DL and the pixel electrode PX(R) is obtained, and the generation of so-called smear in the display can be restrained.

This embodiment can be naturally applied to the liquid crystal display device of a partial transmission type of the construction shown in FIG. 1, and can be also applied to the liquid crystal display device of a reflection type in which the pixel electrode PX(R) also used as the reflection film is formed approximately over the entire pixel area.

As can be seen from the above explanation, a structure for avoiding the light leakage can be obtained in accordance with the liquid crystal display device in the present invention.

What is claimed is:

1. A liquid crystal display device comprising a light reflection area formed with a first pixel electrode also used as a reflection film in one portion of a pixel area on one side of a first substrate facing a liquid crystal layer which is sandwiched between the first substrate and a second substrate, and a light transmission area formed with a second pixel electrode of a light transmission property in another portion than the one portion of the pixel area;
   wherein the first pixel electrode is formed on an upper surface of said one side of the first substrate except for an opening portion of an insulating film in which the opening portion is formed corresponding to the light transmission area,
   the opening portion of the insulating film tapers towards the upper surface of the first substrate and is defined by a taper formed on a side wall of the insulating film, and at least one portion of the taper is not covered with the first pixel electrode, but is exposed, and the insulating film has a light absorption property in at least the taper portion, and
   an opening width of a upper face of the opening portion is set as A and an opening width of a lower face of the opening portion is set as B, A and B satisfy a relation of $100\% > B/A \geq 90\%$.

2. A liquid crystal display device according to claim 1, wherein the entire insulating film has the light absorption property.

3. A liquid crystal display device according to claim 1, wherein the insulating film has a dark color in its light absorption property.

4. A liquid crystal display device according to claim 1, wherein the insulating film has a black color in it light absorption property.

5. A liquid crystal display device according to claim 1, wherein the entire insulating film has the light absorption property, and the light transmittance of its maximum film thickness portion is 30% or less.

6. A liquid crystal display device according to claim 1, wherein the entire insulating film has the light absorption property, and the light transmittance of its maximum film thickness portion is 10% or less.

7. A liquid crystal display device comprising pixel areas each surrounded by gate signal lines arranged in parallel on one side of a first substrate facing a liquid crystal layer which is sandwiched by the first substrate and a second substrate, and drain signal lines crossing the gate signal lines and arranged in parallel,
   a switching element operated by a scanning signal from one of the gate signal lines and a pixel electrode for supplying a video signal thereto from one of the drain signal lines through this switching element are arranged in one of the pixel areas;
   at least an insulating film covering said one of the drain signal lines and formed in at least one portion of said one of the pixel area; and
   a reflection film formed on the upper face of the insulating film in said at least one portion of said one of the pixel areas functioning as the pixel electrode,
   wherein the insulating film has a light absorption property, and the pixel electrode also used as the reflection film is formed by arranging a clearance between the pixel electrode and said one of the drain signal lines when the pixel electrode is seen in a plane view.

8. A liquid crystal display device according to claim 1, wherein the liquid crystal display device uses a normally black mode in which black display is performed when an electric field applied to the liquid crystal is small.

9. A liquid crystal display device according to claim 1, wherein a backlight is arranged on the side opposed to the liquid crystal of the one substrate.

10. A liquid crystal display device according to claim 7, wherein the liquid crystal display device uses an normally black mode in which black display is performed when an electric field applied to the liquid crystal is small.

11. A liquid crystal display device according to claim 7, wherein a backlight is arranged on the side opposed to the liquid crystal of the one substrate.

12. A liquid crystal display device according to claim 7, wherein the insulating film has a dark color in its light absorption property.

13. A liquid crystal display device according to claim 7, wherein the insulating film has a black color in its light absorption property.

14. A liquid crystal display device according to claim 7, further comprising:
   a light reflection area where the pixel electrode also being used as a reflection film is formed;
   a light transmission area where a pixel electrode of a light transmission property is formed;
   wherein the pixel electrode also used as the reflection film is formed on an upper surface of said one side of the first substrate except for an opening portion of the insulating film in which the opening portion is formed corresponding to the light transmission area, and
   the opening portion of the insulating film tapers towards the upper surface of the first substrate and is defined by a taper formed on a side wall of the insulating film, and at least one portion of the taper is not covered with the pixel electrode also used as the reflection film, but is exposed, and the insulating film has a light absorption property in at least the taper portion.

15. A liquid crystal display device according to claim 14, wherein an opening width of an upper face of the opening portion is set as A and an opening width of a lower face of the opening portion is set as B, A and B satisfy a relation of 100%>B/A≧90%.

16. A liquid crystal display device according to claim 14, wherein the entire insulating film has the light absorption property.

17. A liquid crystal display device according to claim 14, wherein the insulating film has a dark color in its light absorption property.

18. A liquid crystal display device according to claim 14, wherein the insulating film has a black color in its light absorption property.

19. A liquid crystal display device according to claim 14, wherein the entire insulating film has the light absorption property, and the light transmittance of its maximum film thickness portion is 30% or less.

20. A liquid crystal display device according to claim 14, wherein the entire insulating film has the light absorption property, and the light transmittance of its maximum film thickness portion is 10% or less.

* * * * *